Patented Apr. 1, 1952

2,591,651

UNITED STATES PATENT OFFICE 2,591,651

STABILIZED ORGANIC COMPOSITIONS CONTAINING BIS(HYDROXY ALKOXY PHENYL) ALKANES

David W. Young, Roselle, N. J., assignor to Standard Oil Development Company, a corporation of Delaware No Drawing. Application November 21, 1949, Serial No. 128,678

9 Claims. (Cl. 44—78)

This invention relates to the stabilization of organic compounds which tend to deteriorate in storage or in use due to undesirable oxidation reactions. In accordance with this invention, these organic compounds, and especially hydrocarbon type compounds, are stabilized against oxidation by incorporating therein small amounts of bis (hydroxy alkoxy phenyl) alkanes.

Various organic compounds and mixtures, including motor fuels, mineral oils, lubricating oils, drying oils, waxes, rubbers, animal and vegetable fats and oils, etc., are adversely affected by oxygen, with the resultant formation of undesirable gums and usually discoloration of the organic compounds as well as other deleterious reactions.

Thus, for example, in the oil refining industry, in order to prepare fuel of superior quality, it is generally necessary to stabilize the fuel against degradation which would normally occur due to oxidation of the fuel components. In general, hydrocarbon mixtures falling in the gasoline or lubricating oil boiling range, if unstabilized, will over a period of time under certain conditions be subject to gum formation, sludge formation, the formation of acids and the formation of objectionable color bodies.

It is also known that synthetic rubbers undergo changes due to further polymerization or degradation due to depolymerization on exposure to air and consequently yield on vulcanization inferior products unless there is incorporated therewith at time of synthesis a compound which stabilizes the synthetic rubber by largely preventing oxidation, degradation and/or cyclization of the chain molecules present in the polymer structure. Natural, as well as synthetic, rubbers require an anti-oxidant present in the vulcanizate in order that finished rubber products are stable toward oxidation and heat during their useful life.

It has now been found that bis (hydroxy alkoxy phenyl) alkanes in which the hydroxyl group is para to the alkoxy group are extremely effective oxidation inhibitors, and stabilizers for many materials which usually degrade in the presence of air and/or heat. These compounds, which are believed to be novel, may be further considered as bis (2-hydroxy-5-alkoxy phenyl) alkanes, as the para position of the alkoxy group relative to the hydroxyl group is critical.

Suitable compounds of the indicated type are thus illustrated in Formula I below:

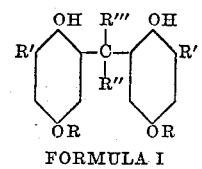

FORMULA I wherein R is an alkyl group, R' is a radical selected from the group consisting of hydrogen, alkyl and aralkyl radicals, and R'' and R''' are radicals selected from the group consisting of hydrogen radicals and alkyl radicals.

Those compounds wherein the R radical contains from one to four carbon atoms, the R' contains from four to eight carbon atoms and is of the tertiary type, and the R'' and the R''' contain no more than ten carbon atoms, are especially effective. A small amount of the R' may be positioned ortho to the alkoxy group. Particularly effective and desirable compounds of the class of compounds of this invention are 2,2-bis - (2 - hydroxy -3- t-butyl-5-methoxy phenyl) propane and 2,2-bis-(2-hydroxy - 5 - methoxy phenyl) propane.

Among the other particular compounds which may be used for the purpose of this invention are the following: 2,2-bis-(2-hydroxy-3-alpha-methyl benzyl-5-methoxy phenyl) propane, 2,2-bis-(2-hydroxy-3-t-octyl-5-methoxy phenyl) propane, 2,2-bis-(2-hydroxy-3-isopropyl-5-methoxy phenyl) propane, 2,2-bis-(2-hydroxy - 3 - t - butyl-5-ethoxy phenyl) propane, 2,2-bis-(2-hydroxy-3-t-butyl-5-heptoxy phenyl) propane, 2,2-bis-(2-hydroxy-3-C9 polypropylene -5- methoxy phenyl) propane, bis (2-hydroxy-3-t-butyl-5-methoxy phenyl) methane, bis (2-hydroxy-3-t-butyl-5-methoxy phenyl) butane, bis (2-hydroxy-3-t-butyl-5-methoxy phenyl) ethane, 2,2-bis (2-hydroxy-5-ethoxy phenyl) propane, 2,2-bis (2-hydroxy-5-butoxy phenyl) propane, bis (2-hydroxy-5-methoxy phenyl) methane.

The compounds of this invention, which, as stated above, are believed to be novel, may be prepared in general by the condensation reaction of two moles of the corresponding alkoxy phenol with the corresponding ketone or aldehyde. Approximately one mole of sulfuric acid and traces of alpha-mercaptopropionic acid are employed to catalyze the reaction when ketones are used. A solvent such as heptane is also employed and the temperature is maintained at an upper limit of about 50° C. The desired compounds which are water-insoluble and are contained in the solvent are then washed with water or 5% sodium carbonate. The heptane solvent is then evaporated and the product is obtained in relatively pure form.

The preparations of the reactants employed in the indicated reaction are well known in the art and need not be given here.

The following examples are given to illustrate this invention and include both the preparation of the bis (2-hydroxy-5-alkoxy phenyl) alkanes of this invention and test results on the compounds used as antioxidants.

EXAMPLE 1

Preparation of 2,2-bis-(2-hydroxy-3-t-butyl-5-methoxy phenyl) propane 2-t-butyl-4-methoxy phenol (360 gm.) was placed in 2 l. Pyrex E type flask with 58 grams of acetone. To act as a solvent 210 grams of pure heptane was added. Then, to act as a catalyst, 150 grams of concentrated HCl acid was slowly added along with 5 grams of

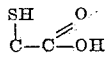

(thioglycolic acid). The mixture was agitated for one hour at 25° C. After this, 40 grams of 10–20 mesh CaCl₂ was slowly added. The flask was once again well stoppered and agitated for 16 hours in a mechanized shaker at 25–35° C. After this reaction the organic material was all removed from the water and CaCl₂ by several extractions (about three) with heptane. A total of 420 grams of heptane was used. The heptane solution of anti-oxidant was washed in a flask with water, as well as 5% NaHCO₃. The washed heptane solution was dried over CaCl₂ and then distilled. Three cuts were taken:

1st cut, 33 g. 140–155° C. at 10 mm. Hg
2nd cut, 28.7 g. 165–205° C. at 10 mm. Hg
3rd cut, 248 g. 260–265° C. at 10 mm. Hg All of the cuts display antioxidant properties and a mixed reaction product may therefore conveniently be employed as an antioxidant. The third cut was the pure product and analysis indicated the product had 74.99% C. and 9.12% H.

EXAMPLE 2

Preparation of 2,2-bis(2-hydroxy-5-methoxy phenyl) propane

One mole of 4-methoxy phenol (108 g.) was reacted in a well stoppered Pyrex E flask with ½ mole of acetone and ½ mole of 38% HCl acid. The weight of acetone used was 29.0 grams and the weight of acid used was 47.4 grams. After ten days time at 25° C. the reaction product was well washed with water and 5% NaHCO₃, dried, and then distilled. The purer 2,2-bis(2-hydroxy-5-methoxy phenyl) propane cut had a boiling point of 345 to about 410° C. at 760 mm. Hg. The material was a very light yellow solid at room temperature. The cut with a boiling point of 345 to 410° C. had a molecular weight of 267 and upon analysis it had 71.40% C and 7.65% H. The final weight of this cut was 62.7 grams.

The compounds of this invention, singly or in mixtures, are particularly adapted for use in cracked gasolines, lubricating oils, natural and synthetic rubbers The following examples illustrate the efficiency of the compounds of this invention in preventing the oxidation of these and similar substances.

EXAMPLE 3

Preparation of bis (2-hydroxy-3-t-butyl-5 methoxy phenyl) methane 2,t-butyl-4-methoxy phenol (52 g.) was added to a one liter three neck Pyrex flask, fitted with agitator and water reflux condenser. To this was added 100 milliliters of 58% formaldehyde solution and 30 grams of concentrated HCl. The mixture was agitated at 60–90° C. for ½ hour. Final mixture was dissolved in 200 grams of benzene. The benzene solution was washed with water and 5% NaHCO₃. The solution was dried for 24 hours over CaCl₂ and then distilled under vacuum. The pure bis (2-hydroxy-3-t-butyl-5-methoxy phenyl) methane had a boiling point of 240° C. at 12 mm. Hg. The yield of product was 54 grams.

EXAMPLE 4

2,2-bis-(2-hydroxy-3-t-butyl-5-methoxy phenyl) propane was tested for its oxidation inhibiting efficiency on GR–I rubber (low unsaturation isobutylene-diolefin polymer, see U. S. 2,356,128), a copolymer of isobutylene and isoprene. This test was conducted as follows: A small piece of raw GR–I rubber containing no inhibitor was placed in a dark air oven maintained at a temperature of 110° C. Another piece of rubber which had admixed 0.25% of 2,2-bis-(2-hydroxy-3-t-butyl-5-methoxy phenyl) propane was placed in the oven. Staudinger molecular weights were determined before and after the aging. The results were as follows:

| | Molecular Wt. vs. Time | | |
| --- | --- | --- | --- |
| | 0 Hrs. | 24 Hrs. | 48 Hrs. |
| GR–I rubber containing 0.25% by weight of 2,2-bis-(2-hydroxy-3-t-butyl-5-methoxy phenyl) propane | 32,000 | ---------- | 26,000 |
| Control | 32,000 | 17,000 | 12,000 |

This test indicates that the molecular weight of the synthetic rubber containing the antioxidant was more than 100% greater than the control after the test period and emphasizes how the degradation of the rubber was prevented.

EXAMPLE 5

2,2-bis-(2 hydroxy-3-t-butyl-5-methoxy phenyl) propane was tested for oxidation inhibiting efficiency on a cracked leaded commercial premium gasoline.

In this example, the evaluation test used was the ASTM Oxidation Stability Test designated as ASTM–D–525–46. This test essentially consists of placing 50 cc. of the composition being tested in a bomb, after which oxygen is added to provide a pressure of about 100 lbs. p. s. i. g. This bomb is then heated to about 100° C. and the pressure in the bomb is determined at 15 minute intervals. When sufficient time has passed so that the pressure drops two lbs. p. s. i. g. in 15 minutes, the test is discontinued and the time required to reach this condition is recorded at the induction period or the ASTM breakdown time and is ordinarily given in minutes. A material subjected to this test which is markedly unstable to oxidation will result in an ASTM breakdown time of one hour about, while an oxidation stable mixture will be characterized by breakdown times of 150 minutes or longer.

| | Breakdown time, minutes |
|---|---|
| No antioxidant | 130 |
| 2 lbs. of 2,2-bis-(2-hydroxy-3-t-butyl-5-methoxy phenyl) propane per 5,000 gal. of gasoline | 640 |
| 2.4 lbs. of 2,2-bis-(2-hydroxy-3-t-butyl-5-methoxy phenyl) propane per 5,000 gal. of gasoline | 900 |

By way of comparison, it is pointed out that the same gasoline admixed with (N,N di-sec-butyl-p-phenylene diamine), a widely used inhibitor, in the same amounts as the 2,2-bis-(2-hydroxy-3-t-butyl-5-methoxy phenyl) propane, reached the test end point 60 and 100 minutes earlier, respectively.

This test clearly illustrates the efficacy of the compounds of this invention in preventing gasoline deterioration.

EXAMPLE 6

2,2-bis-(2-hydroxy - 3 - t - butyl - 5 - methoxy phenyl) propane was tested for oxidation inhibiting efficiency on Andok C grease (a metal stearate thickened mineral oil). The "Normal Hoffman" oxidation test was used. This test comprises placing the grease in glass sample dishes in an oxidation bomb at 210° F. and 110 lbs. of initial oxygen pressure, using 20 gram samples of the grease. The pressure drop is measured periodically. The results were as follows:

| | Pressure Drop in Hours | | | | | |
|---|---|---|---|---|---|---|
| | 16 | 24 | 46 | 70 | 88 | 158 |
| 0.25% by weight of 2, 2-bis-(2-hydroxy-3-t-butyl-5-methoxy phenyl) propane | p.s.i. 5 | p.s.i. | p.s.i. 23 | p.s.i. 32 | p.s.i. 38 | p.s.i. 58 |
| Control | | 65 | 73 | | | |

These results indicate how much more stable the grease was when mixed with the indicated amounts of 2,2-bis-(2-hydroxy - 3 - t - butyl-5-methoxy phenyl) propane.

EXAMPLE 7

2,2-bis-(2-hydroxy - 3 - t - butyl - 5 - methoxy phenyl) propane was tested for oxidation inhibiting efficiency on a highly refined mineral oil using the Army-Navy Aeronautical Specification Test AN-O-366, F-4-e.

*Effect of antioxidants on corrosion and oxidation stability of highly refined mineral oil (Esso 20 Base)*

TEST AN-O-366

[Oil oxidized 168 hrs. at 250° F.]

| | Additive Amount | Per cent Evaporation Loss | Cu | | Mg | | Al | | Fe | | Cd | |
|---|---|---|---|---|---|---|---|---|---|---|---|---|
| | | | Mg. | App. | Mg. | App. | Mg. | App. | Mg. | App. | Mg. | App. |
| Control | 0 | 1.6 | −0.72 mg. per cm.² | Magenta Brassy. | +0.3 per cm.² | Gray | +0.01 mg. per cm.² | No discoloration. | +0.01 mg. per cm.² | Green | +0.05 mg. per cm.² | No discoloration. |
| 2,2-bis(2-hydroxy-3-t-butyl-5-methoxy-phenyl)propane | 0.5% by wt. | 0.8 | −0.57 mg. per cm.² | Brassy discoloration. | +0.3 per cm.² | Slight discoloration. | No change. | No change | +.01 per cm.² | Brownish | +.01 mg. per cm.² | Do. |

*Effect of antioxidants on corrosion and oxidation stability of highly refined mineral oil (Esso 20 Base)*

TEST AN-O-366

[Oil oxidized 168 hrs. at 250° F.]

| | Appearance of Oil After Test | Original Neut. No. | Neut. No. After Test | Neut. No. Increase | Original K. Vis. at 130° F. | Final K. Vis. at 130° F. |
|---|---|---|---|---|---|---|
| Control | Very slight amount of insoluble or gum separated out. | alk. 0.13 | acid 0.04 | 0.17 | 38.21 | 43.24 |
| 2,2-bis(2-hydroxy-3-t-butyl-5-methoxy phenyl) propane. | No insoluble or gum separated out. | alk. 0.03 | acid 0.07 | 0.10 | 38.07 | 44.29 |

The results indicate the marked improvement of the oil stability obtained by the use of 2,2-bis-(2-hydroxy-3-t-butyl-5-methoxy phenyl) propane.

It is to be seen from the above examples that the compounds of this invention provide markedly effective oxidation inhibition. As a result of these tests, it is contemplated in accordance with this invention that the class of inhibitors indicated may be used generally to stabilize oxidation unstable mixtures.

It is particularly proposed that the anti-oxidants of this invention be employed to stabilize hydrocarbon mixtures such as gasoline or lubricating oils and particularly that they should be used to stabilize the class of oils known as turbine oils. Turbine oils are highly refined lubricating oils having a range in Saybolt viscosity at 210° F. from about 43 to 145 to which are added suitable anti-oxidants, rust preventives, pour depressants, V. I. improvers, metallic soaps and other additives.

The synthetic rubbers which may be stabilized in accordance with this invention in addition to the GR-I are the polymers of monomeric materials consisting predominantly of a polymerizable conjugated diolefin having four to six carbon atoms, e. g., 1,3 butadiene, isoprene, 2,3-dimethylbutadiene - 1,3 2 - chlorobutadiene-piperylene, 2 - methylpentadiene - 1,3 and the like; hence synthetic rubbers of the above class include polymers of these materials and also copolymers prepared by the polymerization of monomer mixtures consisting predominantly of such a polymerizable butadiene-1,3 and also containing, if desired, other monoethylenically unsaturated compounds copolymerizable with butadienes-1,3, such as acrylonitrile, methyl methacrylate, styrene, alpha methyl styrene, vinyl naphthalene, vinyl ketones, vinylidene chloride, methyl methacrylate, diethyl fumarate, and the like.

The incorporation of the bis (2-hydroxy-5-alkoxy phenyl) alkanes with the synthetic rubber may be carried out simply by adding the compound either in the solid form or in solution, suspension or emulsion to the solid synthetic rubber during the milling operation or to a latex containing the synthetic rubber dispersed in an aqueous medium such as is ordinarily obtained by an emulsion polymerization process.

The amount of bis (2-hydroxy-5-alkoxy phenyl) alkanes added to the normally oxidizable material in order to prevent oxidation varies with different materials. Typical formulations are as follows:

Gasoline—0.1 to 5 lbs. of antioxidant present per 5,000 gallons of gasoline (approximately .0003–0.15 weight percent)
Lubricating oils—0.02 to 10% and preferably 1 to 2% antioxidant by weight
Synthetic rubbers—0.1 to 5% by weight The compounds of this invention may be utilized in conjunction with other antioxidants in order to obtain desirable combinations of properties. Among the other antioxidant materials which may be employed are phenyl-beta-naphthylamine, naphthols, substituted napthols, substituted phenols, substituted catechols, substituted hydroquinones, alkyl phenol sulfides, ketone-amine condensation products and the like.

The antioxidant compounds of this invention have many advantages, among which are their extreme potency, ease of preparation, insolubility in water, good color retention, and their solubility in hydrocarbons.

It is to be understood that the invention is not limited to the specific examples which have been offered merely as illustrations, since other derivatives can be prepared, and that modifications may be made without departing from the spirit of the invention.

What is claimed is:

1. As new chemicals, bis(2-hydroxy-5-alkoxy phenyl) alkanes.

2. As new chemicals, compounds corresponding to the following general formula

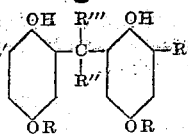

wherein R is an alkyl group, R' is a radical selected from the group consisting of hydrogen, alkyl and aralkyl radicals and R'' and R''' are radicals selected from the group consisting of hydrogen radicals and alkyl radicals.

3. As a new chemical, 2,2-bis-(2-hydroxy-3-t-butyl-5-methoxy phenyl) propane.

4. As a new chemical, 2,2-bis-(2-hydroxy-5-methoxy phenyl) propane.

5. A composition of matter consisting essentially of an organic material selected from the group consisting of grease, synthetic rubber, lubricating oil, drying oil, wax, animal fat, cracked gasoline and mineral oil normally subject to oxidative changes containing a minor proportion effective as an antioxidant of a 2,2-bis-(2-hydroxy-5-methoxy phenyl) propane.

6. A cracked gasoline containing as an inhibitor against oxidative deterioration a bis (2-hydroxy-5-alkoxy phenyl) alkane.

7. A cracked gasoline composition as in claim 6 in which the oxidative inhibitor is present in an amount corresponding to 0.1 to 5 lbs. per 5,000 gallons of gasoline.

8. A cracked gasoline composition as in claim 7 in which the bis (2-hydroxy-5-alkoxy phenyl) alkane is 2,2-bis-(2-hydroxy-3-t-butyl-5-methoxy phenyl) propane.

9. A composition of matter consisting essentially of an organic material normally subject to oxidative changes selected from the group consisting of grease, synthetic rubber, lubricating oil, drying oil, wax, animal fat, cracked gasoline and mineral oil containing a minor proportion effective as an antioxidant of a bis (2-hydroxy-5-alkoxy phenyl) alkane.

DAVID W. YOUNG.

REFERENCES CITED

The following references are of record in the file of this patent:

UNITED STATES PATENTS

| Number | Name | Date |
|---|---|---|
| 1,999,830 | Calcott et al. | Apr. 30, 1935 |
| 2,133,297 | Jones | Oct. 18, 1938 |
| 2,270,959 | Murke et al. | Jan. 27, 1942 |
| 2,310,710 | Rosenwald et al. | Feb. 9, 1943 |

OTHER REFERENCES

Pearl et al., J. Org. Chem., vol. 12, pp. 79–84 (1947). (Copy in Sci. Lib.)